April 4, 1950 R. B. JOHNSON 2,502,960

RECORD CONTROLLED PUNCHING MACHINE

Filed Sept. 6, 1946 9 Sheets-Sheet 1

INVENTOR
REYNOLD B. JOHNSON
BY
J. W. Lonnitz
ATTORNEY

April 4, 1950 R. B. JOHNSON 2,502,960

RECORD CONTROLLED PUNCHING MACHINE

Filed Sept. 6, 1946 9 Sheets-Sheet 2

INVENTOR
REYNOLD B. JOHNSON
BY
J. W. Lowmitz
ATTORNEY

RECORD CONTROLLED PUNCHING MACHINE

Filed Sept. 6, 1946 9 Sheets-Sheet 3

INVENTOR
REYNOLD B. JOHNSON
BY
J. W. Lowenitz
ATTORNEY

RECORD CONTROLLED PUNCHING MACHINE

Filed Sept. 6, 1946 9 Sheets-Sheet 4

INVENTOR
REYNOLD B. JOHNSON
BY
O. W. Lowwitz
ATTORNEY

April 4, 1950 R. B. JOHNSON 2,502,960

RECORD CONTROLLED PUNCHING MACHINE

Filed Sept. 6, 1946 9 Sheets-Sheet 5

INVENTOR
REYNOLD B. JOHNSON
BY
J. W. Lowenitzer
ATTORNEY

April 4, 1950 R. B. JOHNSON 2,502,960

RECORD CONTROLLED PUNCHING MACHINE

Filed Sept. 6, 1946 9 Sheets-Sheet 6

INVENTOR
REYNOLD B. JOHNSON
BY
J. W. Lowenitzer
ATTORNEY

April 4, 1950 R. B. JOHNSON 2,502,960

RECORD CONTROLLED PUNCHING MACHINE

Filed Sept. 6, 1946 9 Sheets-Sheet 7

INVENTOR
REYNOLD B. JOHNSON
BY
J. W. Lowenitzer
ATTORNEY

April 4, 1950 R. B. JOHNSON 2,502,960

RECORD CONTROLLED PUNCHING MACHINE

Filed Sept. 6, 1946 9 Sheets-Sheet 8

INVENTOR
REYNOLD B. JOHNSON
BY
J. W. Lowmitzer
ATTORNEY

April 4, 1950 R. B. JOHNSON 2,502,960

RECORD CONTROLLED PUNCHING MACHINE

Filed Sept. 6, 1946 9 Sheets-Sheet 9

INVENTOR
REYNOLD B. JOHNSON
BY J. W. Lorenitzer
ATTORNEY

Patented Apr. 4, 1950

2,502,960

UNITED STATES PATENT OFFICE 2,502,960

RECORD CONTROLLED PUNCHING MACHINE

Reynold B. Johnson, Binghamton, N. Y., assignor to International Business Machines Corporation, New York, N. Y., a corporation of New York Application September 6, 1946, Serial No. 695,092

24 Claims. (Cl. 164—115)

This invention relates to record card, punching machines and more particularly to machines adapted to punch cards of the well known Hollerith type.

The present invention is directed to simplifying the punching of a large number of record cards whereon a large number of card columns are to receive perforations representing data peculiar to each individual card.

An object of the invention is to provide an improved and compact data storage file comprising a multiplicity of stacked wafer-like elements in the form of cards, with automatically operating devices for rapidly locating any card in the stack and reading therefrom data recorded thereon to control the punching of such data in a field of a record card.

A more specific object is to provide such a storage file, in which a plurality of stacks are provided, each placed in a separate drawer or compartment and in which each file card has recorded thereon representations of a plurality of different values. In the embodiment illustrated, four drawers or stacks are provided, each containing two hundred and fifty file cards with each card containing four different sets of value data. Thus, there is provided a set of file cards containing four thousand recorded values. By means of selecting keys, a first selection is made of one of the four sections of each card, thus first selecting a group of one thousand items. A second key selection selects a group of fifty cards from this primarily selected thousand. A third key selection selects a group of five cards in the selected fifty and finally a fourth key selection selects one of the cards in the group of five. Thus, by setting up four selecting keys, one for each of the four subdivisions, a desired one of the four thousand items is selected for control of the punching machine.

Other objects of the invention will be pointed out in the following description and claims and illustrated in the accompanying drawings, which disclose, by way of example, the principle of the invention and the best mode, which has been contemplated, of applying that principle.

Figure 2:
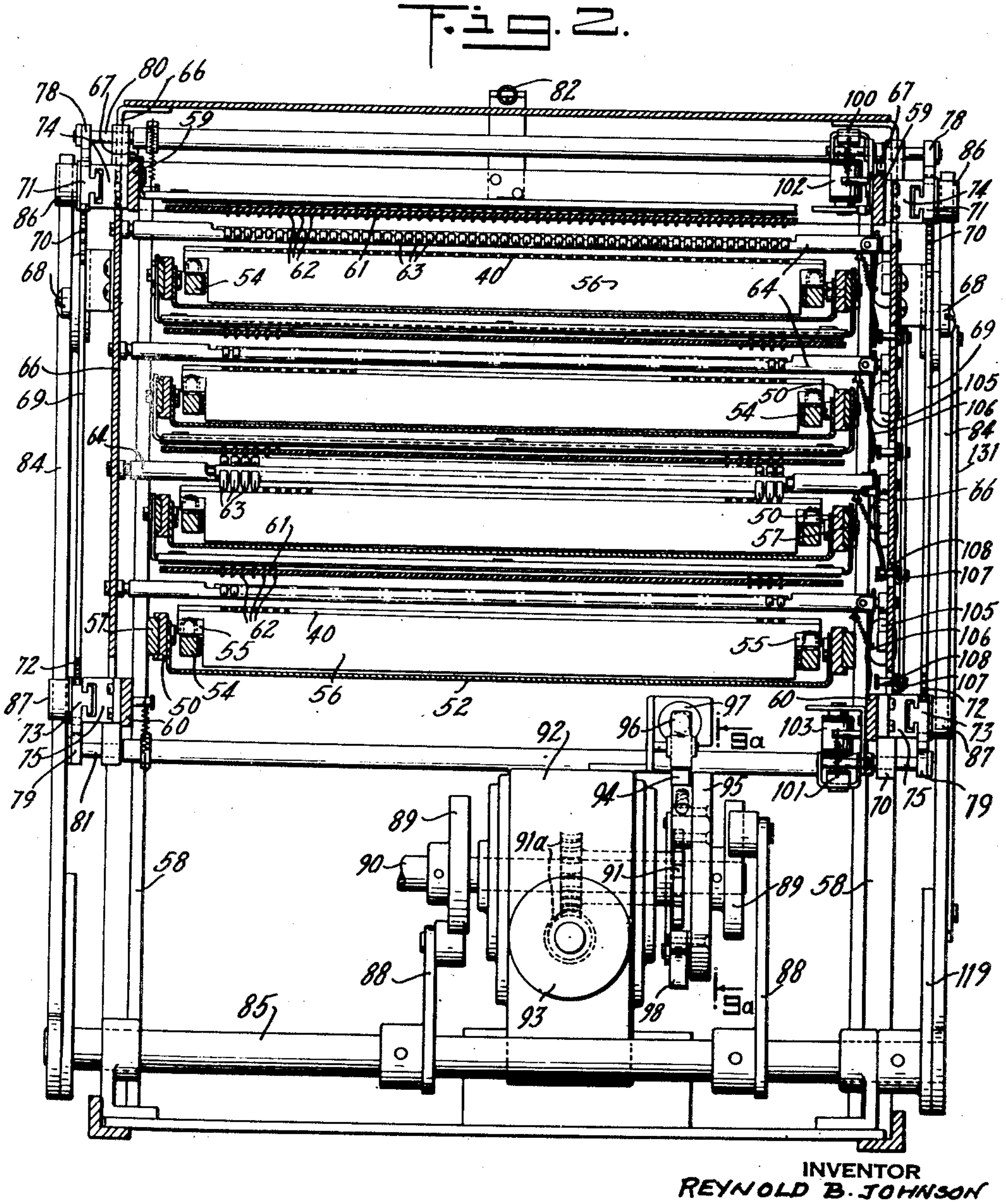
Fig. 2 is a sectional elevation taken on lines 2—2 of Fig. 1.
Figures 9, 9A:
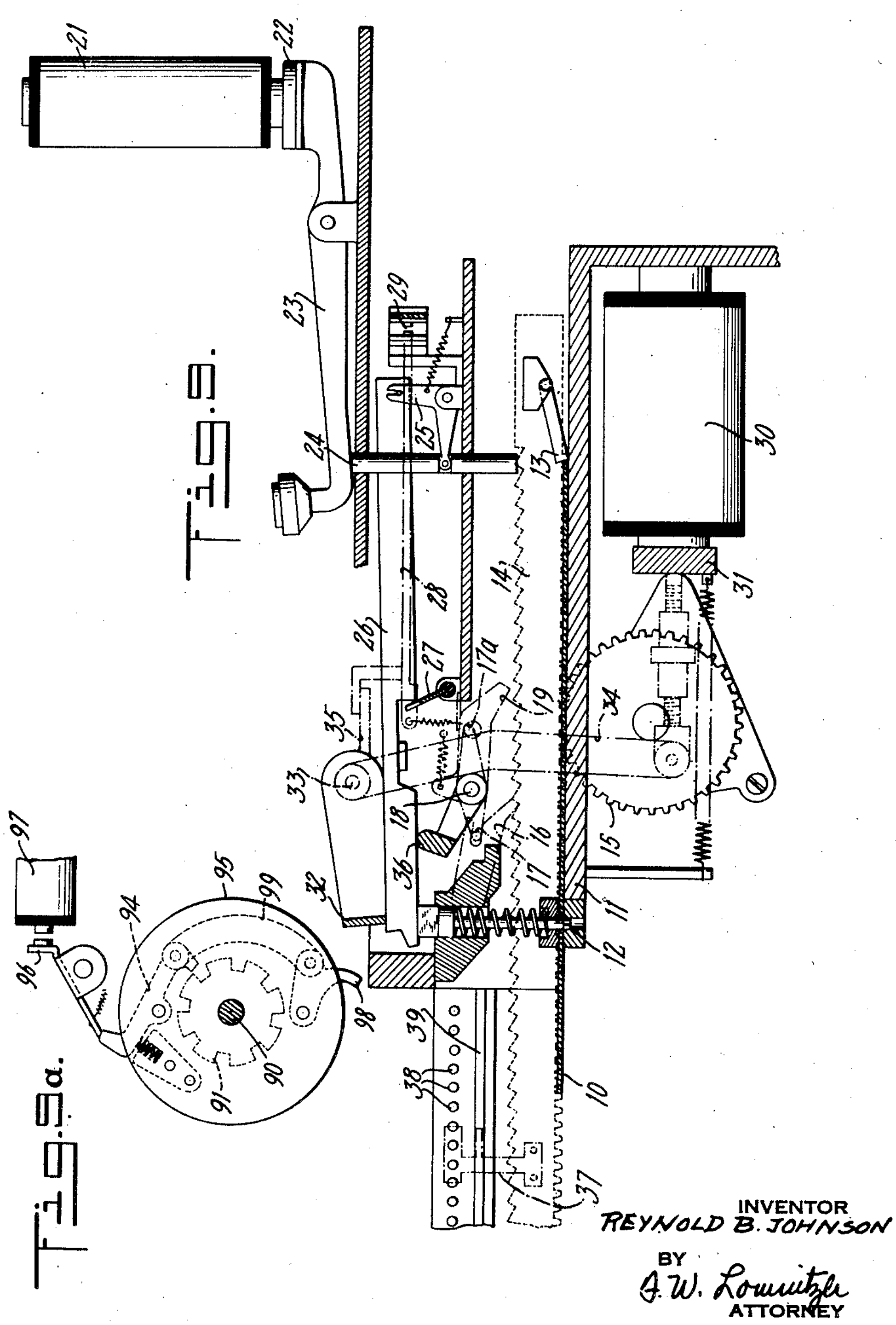
Fig. 9 is a simplified sectional view of the well known punching mechanism.

Fig. 9*a* is a detail taken on lines 9*a*—9*a* of Fig. 2.

Figure 10:
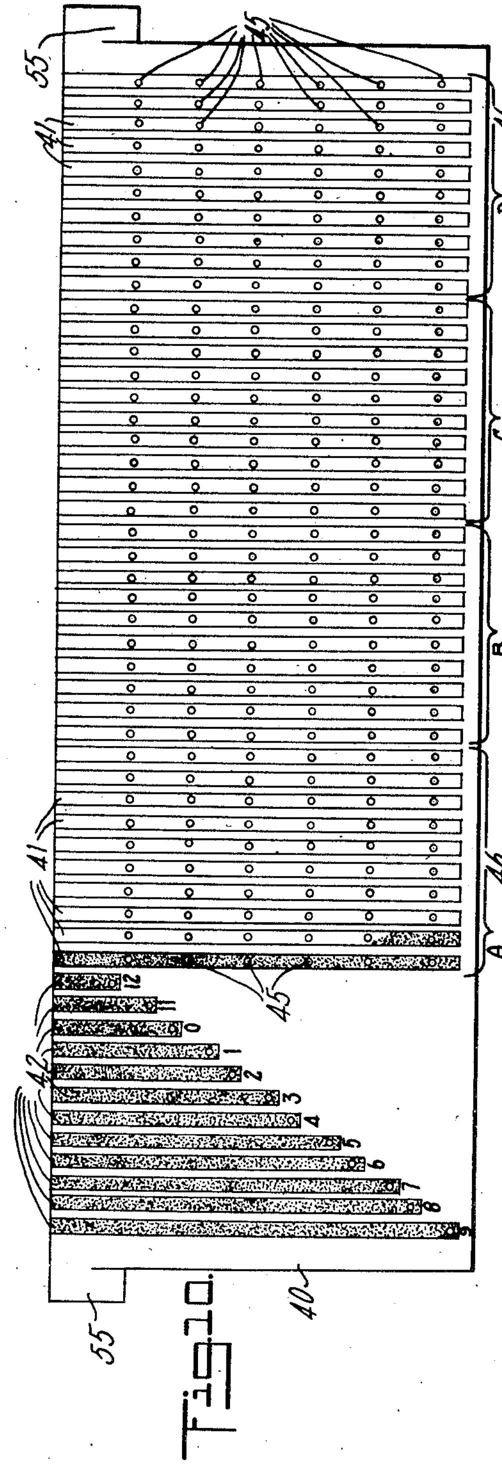
Figure 11:
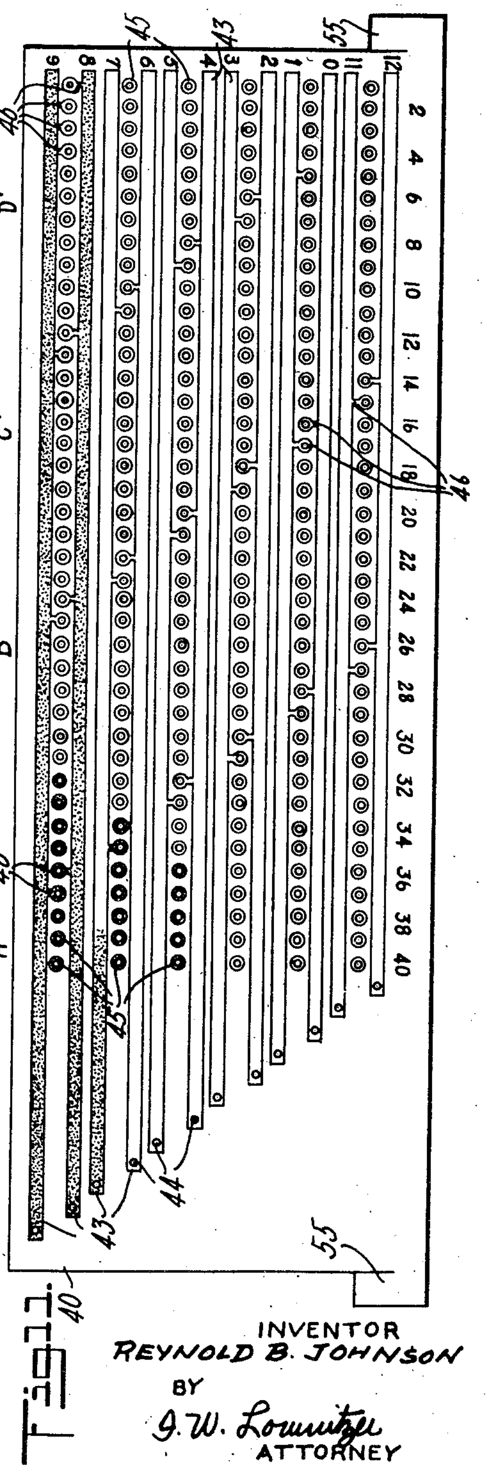

Figs. 10 and 11 are front and rear views, respectively, of one of the file cards.

Figure 12A:
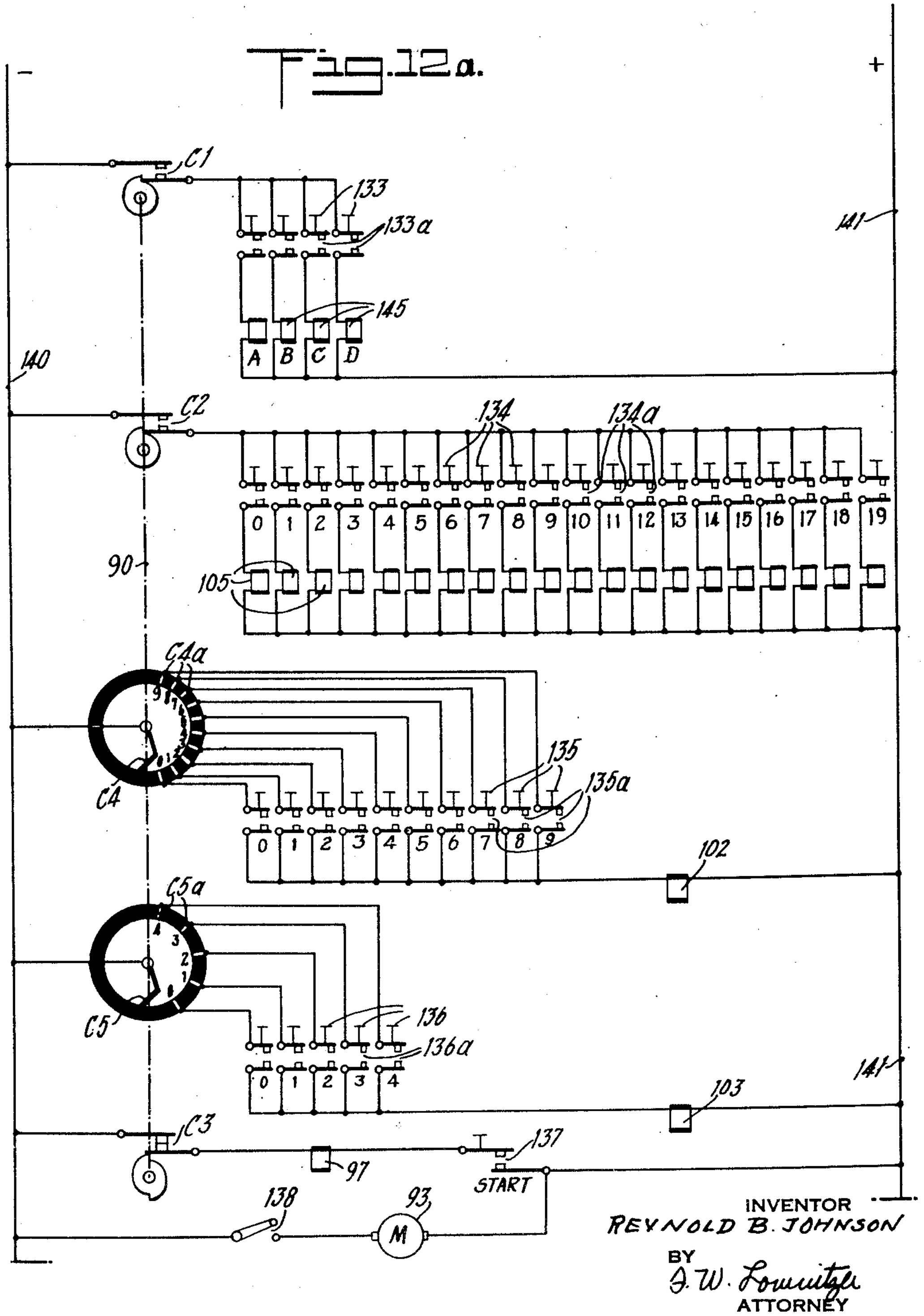
Figure 12B:
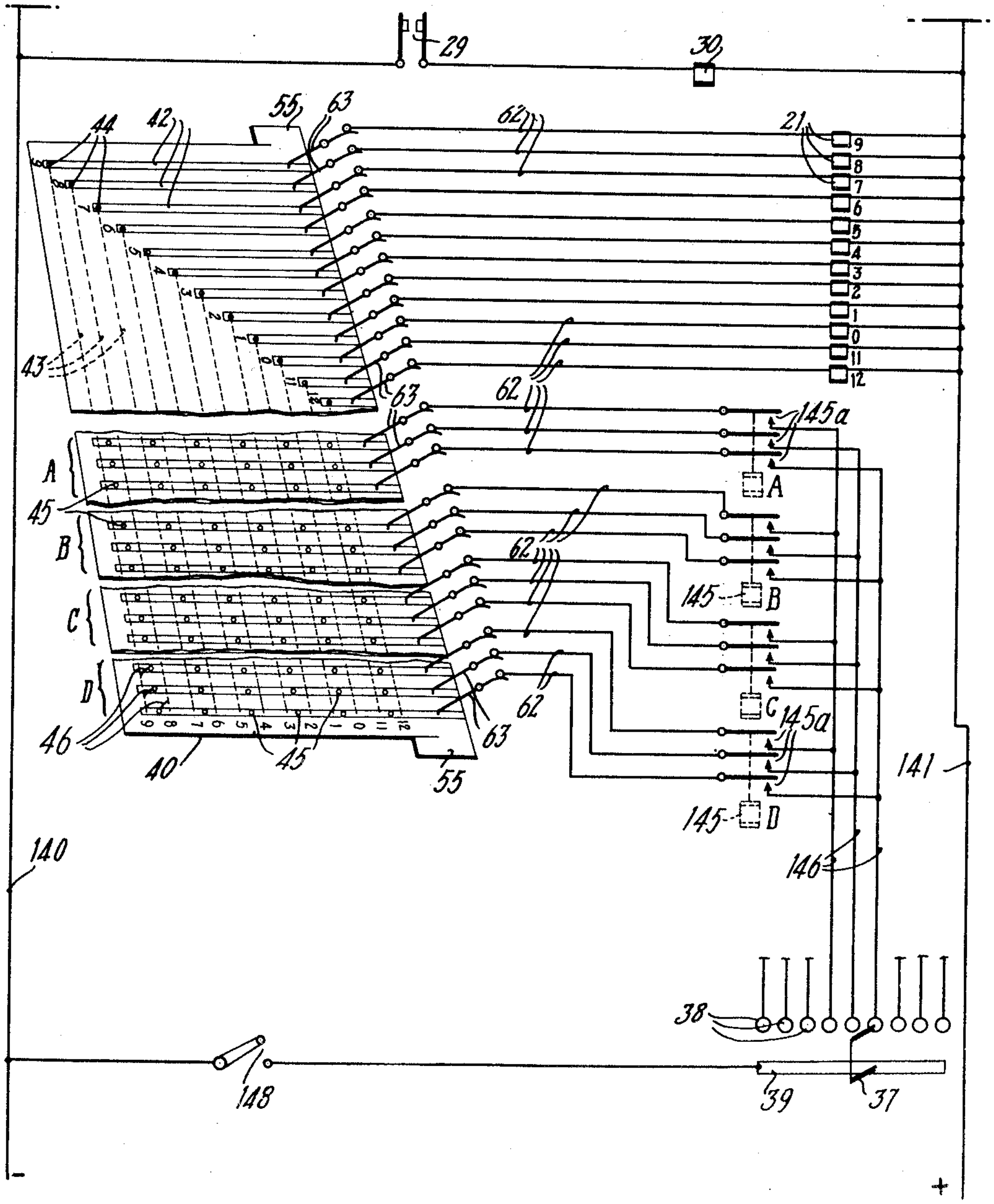

Figs. 12*a* and 12*b*, placed with Fig. 12*a* above Fig. 12*b*, constitute a simplified circuit diagram of the apparatus.

Figure 1:
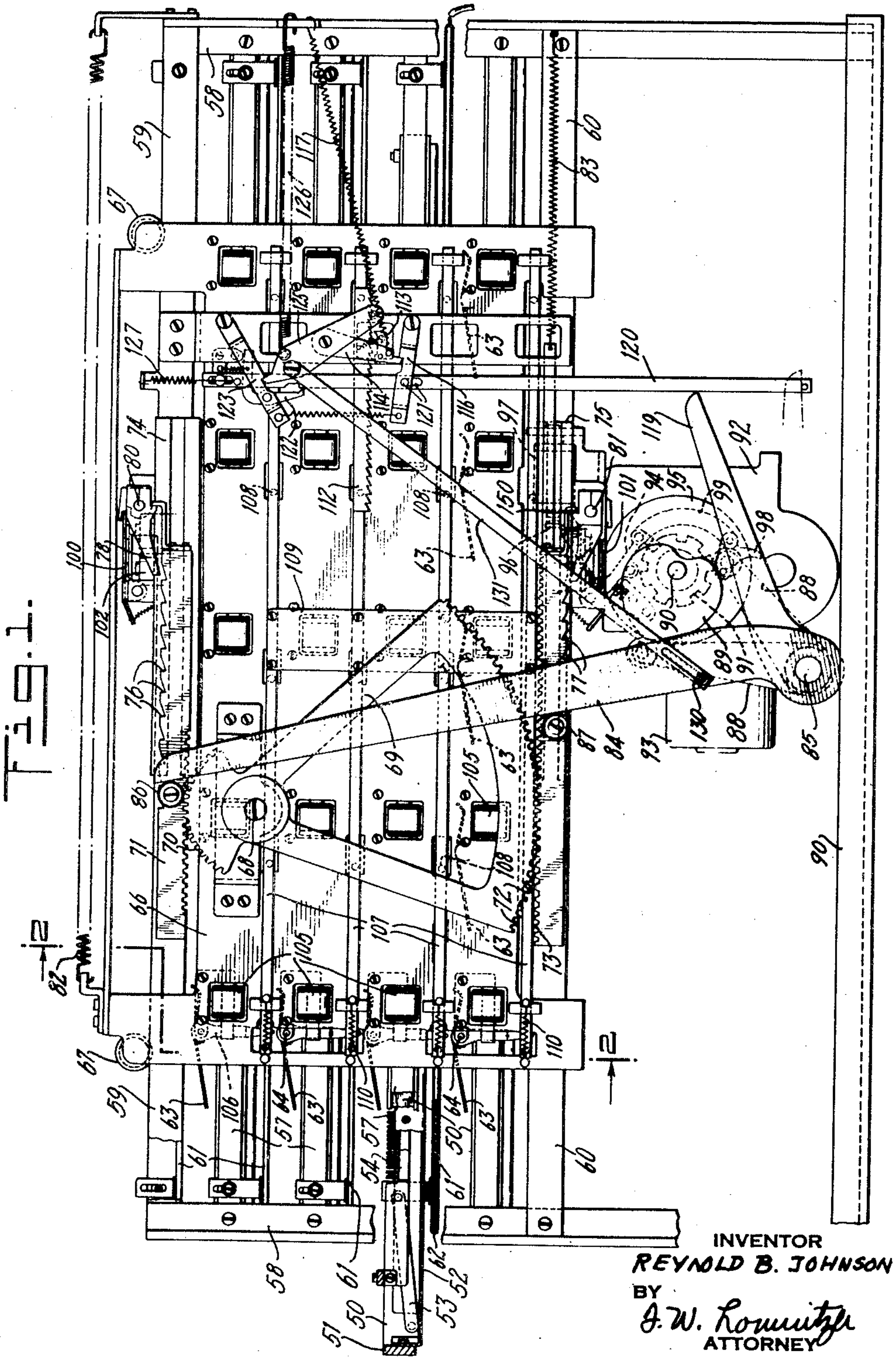
Fig. 1 is a side elevational view of the storage file with its selecting mechanism.
Figure 13:
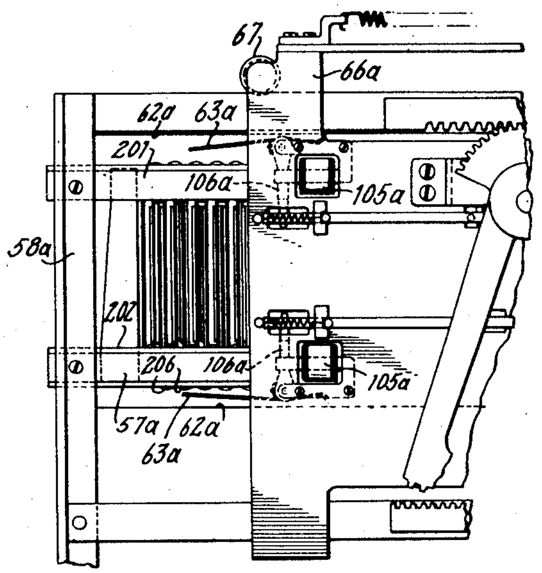

Fig. 13 is a partial view similar to Fig. 1 showing the arrangement of a modified form of the invention.

Figures 14, 15:
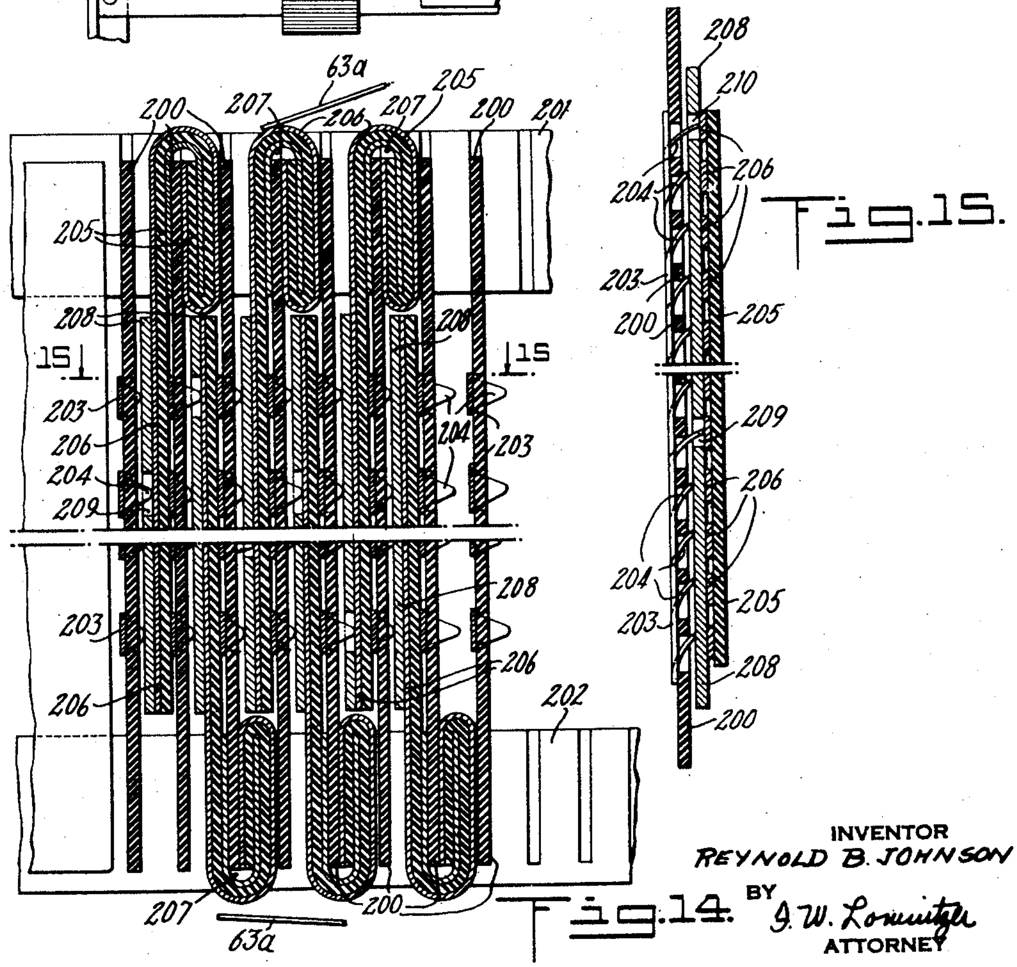

Fig. 14 is an enlarged sectional detail of a modified form of storage file.

Fig. 15 is a section on line 15—15 of Fig. 14.

*The punching mechanism*

The duplicating punch mechanism is substantially the same as that disclosed in United States Patents 1,772,186 and 1,976,618, and its essential mechanism is shown in Fig. 9 wherein a record card 10, in which data is to be punched, is placed on table 11 for movement past punches 12 step by step or column by column. The card 10 is advanced to the left by a pusher 13 carried on an escapement rack 14 which is urged to the left by the usual gear 15 driven by a spring drum (not shown).

The parts in Fig. 9 are shown in their operated positions brought about as follows. Upon energization of punch selecting magnet 21, armature 22 is attracted to rock key lever 23 and depress rod 24 and through bell crank 25 shift interposer 26 to the left. In shifting to the left, interposer 26 rocks a plate 27 which in turn draws a hooked link 28 therewith to close contacts 29. These contacts close a circuit to energize punch magnet 30 which thereupon attracts its armature 31 to rock punch bail 32 pivoted at 33 through a lever 34. Rocking of bail 32 urges the left end of interposer 26 down against punch 12 to perforate the card. At the same time, an extension 35 of bail 32 raises hooked link 28 out of engagement with plate 27, so that contacts 29 reopen under their own resiliency and magnet 30 is deenergized.

The depression of interposer 26 causes rocking of escapement bail 36 and rod 18 which through pin 17 rocks holding pawl 16 into engagement with rack 14 and through pin 17a lifts stepping pawl 19 out of the rack to the position shown. Pawl 19 has a loose connection on rod 18 so that, when raised, it is spring urged slightly to the right in readiness to engage the next tooth in the rack when rod 18 returns clockwise, resulting in a step of advance of the rack 14 and card 10.

It will, of course, be understood that, as usual, there are twelve punches arranged in a row, one behind the other, and each has its individual interposer 26 and selecting magnet 21, and that operation of any magnet 21 will cause closure of contacts 29 and operation of the common punch magnet 30 to perforate in a selected one of twelve punching positions in the card column.

For purposes of simplicity, the punch is illustrated for manual insertion of card 10 and manual shift of the rack to the right, and it will be understood that these operations may be automatic if desired. To rack 14 is secured a wiper 37 which, as the rack advances, successively contacts conducting segments 38 to connect each in turn with a common conductor 39. There is a segment 38 for each card column and, when any column is at the punching position, the wiper 37 is in engagement with the related segment 38.

*The file card*

Referring to Fig. 10, 40 represents one of the storage or file cards of insulating material, which is provided with forty stripes 41 of conducting deposit, such as conductive ink, on one face and at one end with twelve stripes 42 of varying length. On the opposite side (Fig. 11) there are twelve transverse stripes 43 also of conductive ink, each extending from one edge of the card to one of a series of holes 44 arranged in an oblique line and passing through the ends of lines 42 on the reverse side. These holes 44 are coated inside with conductive ink, so that there is an electrical connection between each line 43 and a corresponding line 42. The lines 43 are numbered 12, 11, 0, 1, 2, 3, 4, 5, 6, 7, 8 and 9.

The lines or stripes 41 are divided into four sets of ten lines each and designated as sets A, B, C, D and each line has six holes 45 passing therethrough. To set up a selected value in any column or stripe, a short conductive line 46 (Fig. 11) is manually marked or drawn between the line 43 related to the value to be marked and the adjacent hole in that column. Each hole 45 has its inner surface covered with conductive medium, so that line 46 makes an electrical connection between a selected columnar line 41 and a selected value line 43.

In Fig. 11 values 8, 9, 9, 9, 1, 2, 3, 4, 5, 6 are marked or set up in the ten columns of the D section of the card, and this constitutes a storage of such data in section D of the card. In the other three sections other data is likewise represented.

In the example of Figs. 10 and 11, there is thus provided an electrical connection traceable from line 41 of column 1, section D (Fig. 10), through the lowermost hole 45, short line 46 (Fig. 11) to the 8 line 43, thence through its hole 44 to the 8 line 42 (Fig. 10). In this manner the right hand line 41 is electrically connected to the 8 line 42. Similarly, the next adjacent line 41 is electrically connected to the 9 line 42.

*The file drawer*

Figure 4:
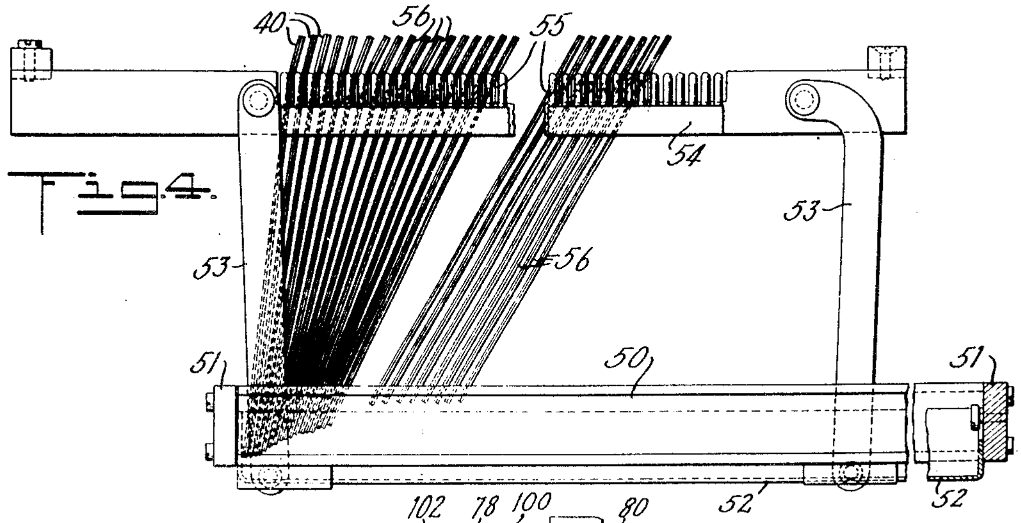
Fig. 4 is a detail showing the manner in which file cards are inserted in a drawer.
Figure 6:
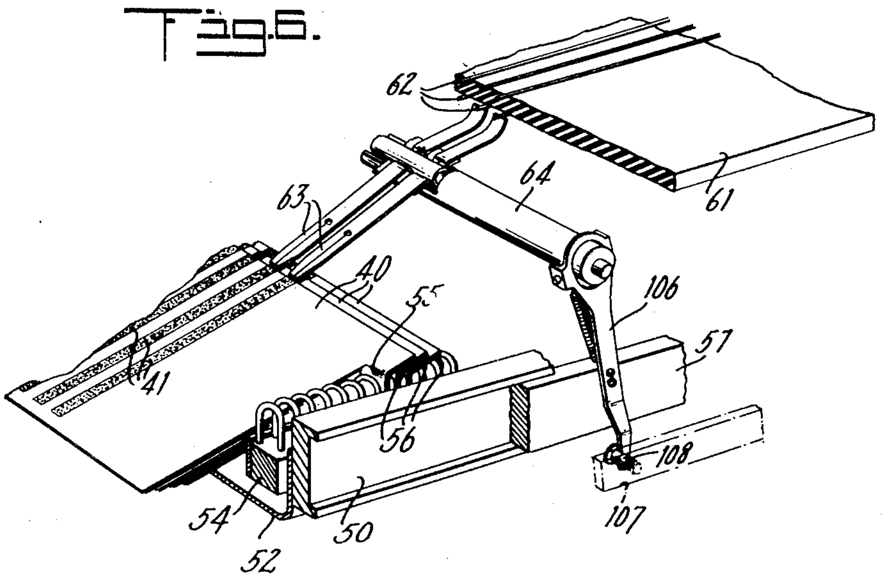
Fig. 6 is a perspective view showing the relationship of the feeler devices with the file cards.

Referring to Figs. 2, 4 and 6, the file drawer comprises a frame having channeled sides 50, end bars 51 and a bottom plate 52. Pivoted at front and rear are links 53 connected by a slotted bar 54 which is raised to the position of Fig. 4 for insertion of the file cards. As seen in Fig. 10, each card has a pair of ears 55 which are inserted in the slots in bars 54, so that the cards initially hang in the slots. Blank insulating cards 56 of the same outline as cards 40 are inserted between adjacent file cards with each file card 40 and an accompanying insulating card 56 being seated in the same slot of bar 54.

After cards 40 and 56 have been inserted, bar 54 is rocked to the position of Figs. 1 and 6, wherein the cards lie at an angle above bottom plate 52 with a small section at the top of each file card exposed. In the present machine, each file drawer, of which four are provided, accommodates two hundred and fifty file cards and are inserted into the machine by sliding channeled sides 50 along rails 57 (Fig. 2) spaced vertically as shown. Rails 57 are supported by end posts 58 which are tied together by bars 59 and 60.

Fixedly suspended above each file drawer is an insulating plate 61 across which extend a number of wires 62 spaced apart and each in line with a column of the file cards.

*Feeler operating structure*

Figure 7:
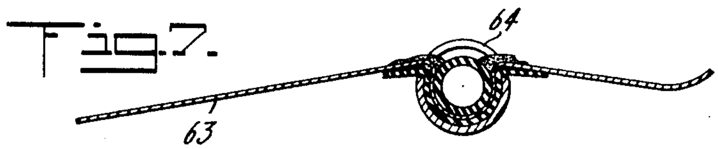
Fig. 7 is a sectional detail of a feeler.

Horizontally movable in the space between file cards 40 and wires 62 are sets of feeler blades 63 which are individually insulated on a rod 64 (see Fig. 7) and normally occupying the horizontal position of Fig. 1. Five rods 64 and sets of feelers 63 are provided for each file drawer and these are reciprocable in unison across the edges of the cards with each feeler rod traversing a distance of fifty cards.

Through mechanism about to be described, the rods 64 are advanced from left to right (as viewed in Fig. 1) and interrupted to stop with the left ends of their feeler blades 63 above the edge of any one of the fifty related cards 40. Thereafter, rod 64 is rocked counterclockwise to the position of Fig. 6, wherein feelers 63 contact wires 62 at one end and the lines 42 and 41 of a selected file card at the other end and thus establish electrical connections between lines and wires.

Referring to Fig. 2, the rods 64, of which there are twenty (five for each file drawer), are pivotally supported in a pair of side frames 66 suitably connected across the top of the machine and provided with rollers 67 (Fig. 1) riding on the uppermost tie bars 59. Pivoted to each frame 66 at 68 is a double gear sector 69 having teeth 70 meshing with an upper rack 71 and teeth 72 meshing with a lower rack 73. These two racks are mounted for reciprocation in fixed channel guides 74 and 75 and have teeth 76 and 77 respectively cooperative with pawls 78 and 79 secured on rods 80 and 81.

Frame 66 is biased toward the right by a spring 82, and lower rack 73 is also urged in the same direction by a spring 83. An arm 84 secured to a shaft 85, when the parts are in home or restored position, engages rollers 86 and 87 in the racks 71 and 73 to hold the racks to the left and through sector 69 hold the frame 66 also to the left. On shaft 85 is secured a pair of follower arms 88 (Fig. 2) cooperating with complementary cams 89 secured to a shaft 90. Freely rotatable on shaft 90 is a continuously rotating clutch element 91 driven through gears generally designated at 91a (Fig. 2) in housing 92 from a motor 93. In the plane of element 91 is a spring pressed dog 94 (Fig. 9a) pivoted to a disk 95 secured to shaft 90. Armature 96 of magnet 97 normally engages dog 94 to hold it out of engagement with element 91. Upon energization of magnet 97, the dog is released to engage element 91 and shaft 90 will accordingly be rotated. After 180° of movement (during which magnet 97 is deenergized), bell crank 98 which is connected by link 99 to dog 94 engages armature 96 and dog 94 is disengaged. A second energization of magnet 97 will thereafter again release the dog 94 to effect a second half revolution of shaft 90. The structure just described constitutes a well known form of half revolution clutch to drive shaft 90 in half revolution steps.

During the first half revolution, the cams 89 rock shaft 85 clockwise as viewed in Fig. 1 and rollers 86 and 87 follow under the tension of springs 82 and 83, so that frame 66 moves likewise.

Figure 5:
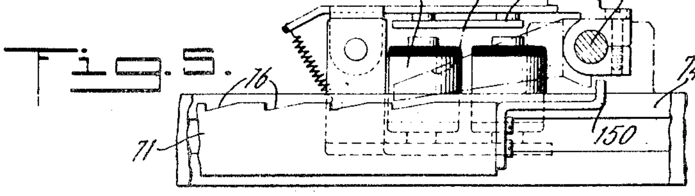
Fig. 5 is a detail of the selecting magnet and its related mechanism.

Pawls 78 and 79 are normally latched out of engagement with their teeth 76 and 77 by armatures 100 and 101 of magnets 102 and 103, respectively. Upon energization of magnet 102 (see Fig. 5) at a selected time during the rightward movement of rack 71, pawl 78 is released to engage a selected tooth 76 to interrupt further movement of rack 71. Similarly, energization of magnet 103 will release pawl 79 to engage a selected tooth 77 to interrupt further movement of rack 72. The differential action of these two racks, through gear sector 69, will accordingly position frame 66 and the feeler rods 64 carried thereby in a selected one of fifty possible positions, during the clockwise rocking of arm 84.

Each of the twenty sets of feelers 63 will now stand in position for rocking into engagement with the same relatively located file card in the related set of fifty. Only one of such sets of feelers will be rocked and such rocking is effected as follows. Just before the end of the clockwise stroke of arm 84, and after the frame 66 is in selected position, one of the twenty magnets 105 carried by frame 66 is energized to rock a finger 106 pivoted on rod 64 in a direction transverse to the axis of the magnet and against a link 107. From this link there project headed pins 108, one for each rod 64, and related finger 106.

Figure 3:
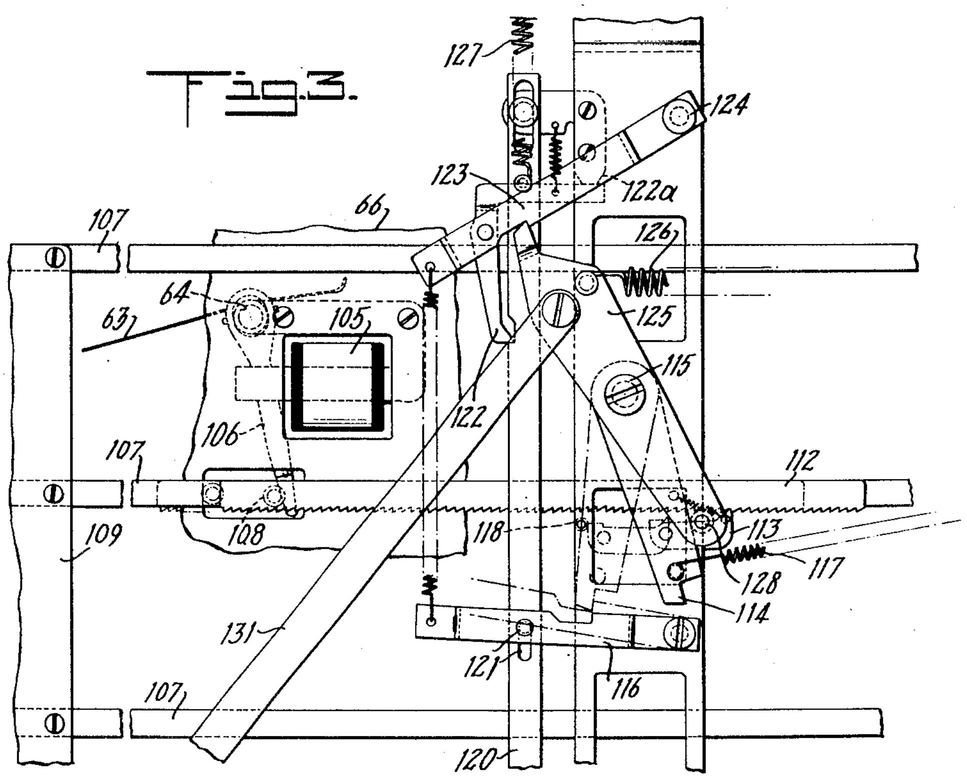
Fig. 3 is an enlarged detail of latching devices shown in Fig. 1.

There are four parallel links 107 tied together for integral horizontal reciprocation by a plate 109, and they are slidably carried on frame 66 with springs 110 normally holding them in a left hand position as shown in Fig. 1. The fingers 106 normally lie out of the path of movement of headed pins 108, so that if links 107 are shifted to the right with respect to frame 66 the pins 108 pass in front of fingers 106. In the selected position wherein a magnet 105 is energized, its finger is drawn into the path of related pin 107 and will be engaged thereby to rock the related rod 64 and feelers 63 to contact the selected file card and wires (see Figs. 3 and 6).

The manner in which links 107 are shifted is as follows. One of them carries a notched plate 112 (Fig. 3) with which a pawl 113 cooperates. This pawl is pivoted to an arm 114 rotatable on a stud 115 and held by a latch 116 against the action of a spring 117. Stud 115 is in a fixed part of the machine framework and pawl 113 normally engages a fixed pin 118 which holds it out of engagement with notched plate 112. Near the end of the clockwise movement of arm 84 an arm 119 (Fig. 1) secured to shaft 85 will engage and draw down on a link 120, so that through pin and slot connection 121 latch 116 is rocked counterclockwise to free arm 114. As the arm 114 now rocks counterclockwise under the influence of spring 117, pawl 113 will engage plate 112 and shift it to the right with respect to frame 66 with the result that the headed pins 108 shift to lock the actuated finger 106.

Link 120, when drawn down, will be engaged and held down by a latch 122 on an arm 123 pivoted at 124, which arm normally holds a lever 125 in its counterclockwise position against the tension of a spring 126. Upon the return of arm 84, link 120 is released to be drawn upwardly by its spring 127 and through latch 122 will rock arm 123 clockwise to free lever 125. The spring 126 will thereupon rock lever 125 clockwise and a pin 128 in its lower extremity will strike against the side of arm 114 to force the arm and its pawl 113 back to initial latched position in which the pawl engages the fixed pin 118 to swing the pawl out of the teeth in plate 112, so that the links 107 can return to the left, free the locked finger 106 and allow the feelers 63 to return to noncontacting positions. An extension of latch 122 will strike a stop 122a to rock the latch out of engagement with link 120 after lever 125 is released.

As arm 84 continues its return stroke, it picks up rollers 86 and 87 to restore the racks 71 and 73 and frame 66 to the left. Near the end of the return stroke of arm 84, a pin 130 therein (Fig. 1) draws on a link 131 (Fig. 3) to rock lever 125 counterclockwise into latching engagement with arm 123, so that at the end of the stroke both levers 125 and 114 are again latched.

*Operation*

Figure 8:
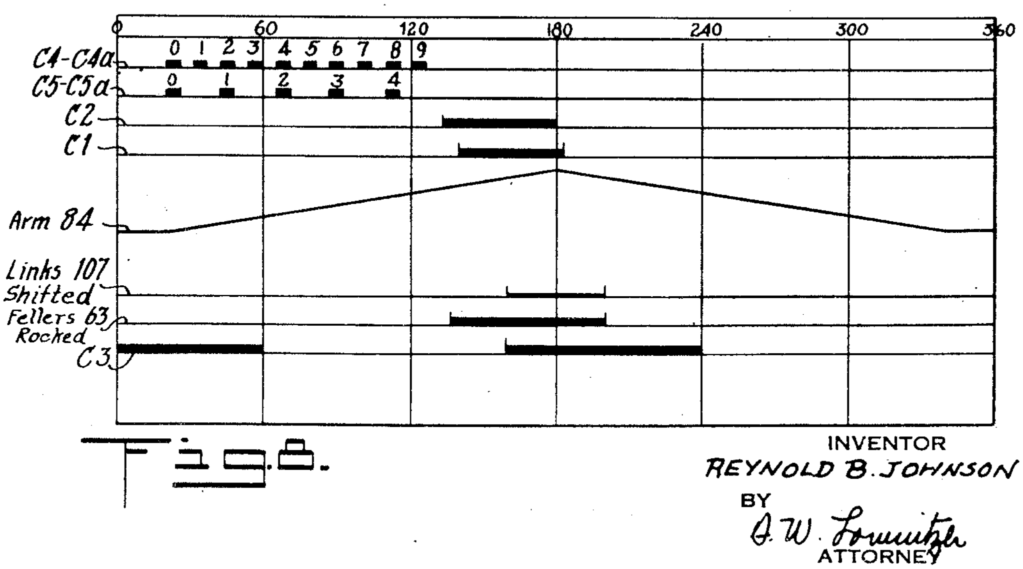
Fig. 8 is a timing diagram of the apparatus.

The entire sequence of operations will now be set forth with particular reference to the wiring diagram (Figs. 12a and 12b) to illustrate the manner in which a selection of a particular file card is effected. In Fig. 12a shaft 90 is diagrammatically represented as carrying three cams for operating contacts C1, C2 and C3 and two rotating wipers C4 and C5 which traverse stationary contact segments C4a and C5a, respectively. The time in a cycle of operation during which the several contacts make is indicated in the time chart (Fig. 8).

A selection of a file card is made by actuating a key 133 to close a pair of contacts 133a in accordance with which group of 1000 cards is primarily involved. A second key 134 is operated to close a pair of contacts 134a to effect a second selection of a group of 50 from the thousand first selected. A third key 135 is operated to effect a third selection of a group of 5 from the set of 50 cards, and a key 136 is operated to effect a fourth selection of 1 from the set of 5 cards. These keys are of the well known latching type in which, in any set, operation of any key will release all others with the las+ operated one remaining latched.

After a key in each set has been actuated, start contacts 137 are manually closed (after switch 138 is closed to energize motor 93) to complete a circuit from line 140, contacts C3, clutch magnet 97, contacts 137 to line 141.

Energization of clutch magnet 97 will couple shaft 90 to the motor 93 and the contact closing devices thereon will make a half revolution and stop. Contacts C3 open to deenergize clutch magnet 97 and it will be understood that contacts 137 are only momentarily closed. As wiper C4 traverses segments C4a, a circuit will be completed at a time (see Fig. 8) corresponding to the value of key 135 operated. Thus, if for example the 8 key is down, a circuit will be completed from line 140, wiper C4, the 8 segment C4a, 8 contacts 135a and magnet 102 to line 141 to trip the related pawl 78 into engagement with the 8 tooth 76 in rack 71 (see Fig. 1).

If, for example, the 4 key 136 is down, a second circuit is also completed from line 140, wiper C5, 4 segment C5a, 4 contacts 136a and magnet 103 to line 141 to trip the related pawl 79 into engagement with the 4 tooth 77 in rock 73. Thus, just after all the segments C4a and C5a have been traversed, the frame 66 will have been selectively positioned with feelers 63 above the forty-fourth card in each set of fifty. Contacts C2 next close and complete a circuit from line 140, contacts C2, 0 contacts 134a (for example), 0 magnet 105, to line 141. The related set of feelers 63 will accordingly be rocked and, while the magnet 105 is still energized, links 107 are shifted to the right as viewed in Figs. 1 and 3 to lock the rocked feelers in contacting position, so that when contacts C2 open to deenergize magnet 105, the feelers 107 will nevertheless remain rocked.

When contacts C1 close, a circuit is completed to energize one of the four relay magnets 145 which close related contacts 145a (Fig. 12b). As noted in Fig. 8, contacts C1 are closed at the half revolution point when shaft 90 comes to rest, so that the selected relay 145 is held energized at this time. The contacts 145a are individually connected to contact wires 62 and through wires 146 they are also connected to punch column selecting segments 38.

If the punch carriage is in position with wiper 37 in the relative position shown in Fig. 12b, reading out of the value in the selected section of the selected file card will commence upon closure of switch 148. Assuming that the D magnet 145 is energized, a circuit is traceable from line 140, switch 148, common 39, wiper 37, segment 38, right hand wire 146, lowermost contacts 145a, wire 62, feeler 63, strip 43 in the 1 column of section D of file card 40, through the hole 45 between the 9 and 8 rows, marked line 46 on the back of the card, 8 line 43, through hole 44 to the 8 line 42, 8 feeler 63, wire 62, 8 punch selecting magnet 21 to line 141.

Energization of the 8 magnet 21 will cause punching of an 8 hole in a column of the record card and as an incident thereto the record card will be stepped with wiper 37 to the next column, wherein a circuit is now traceable through the second wire 146 and the next contacts 145a to the second file card column, in which the digit 9 is marked, to energize the 9 magnet 21 and punch a 9 in the second record card column. Thereafter, in succession, each of the other columns of field D (only three are shown) will control punching.

Switch 148 may then be opened and, if it is desired to punch the same data in further record cards, a new one may be inserted in the punch in proper columnar alignment and switch 148 reclosed to repeat the punch selecting sequence of operations. When all punching is terminated, key contacts 137 (Fig. 12a) are again momentarily closed to initiate a second half revolution of shaft 90 during which, as seen from Fig. 8, contacts C1 open to deenergize the relay 145 followed by unlatching of links 107 to restore the feelers 63 before the frame 66 starts back to home position. Just before it reaches home position, fingers 150 on racks 71 and 73 engage and rock pawls 78 and 79 to their latched position in readiness for a further selecting operation. A new key setting may now be made to select any other file card.

The circuit diagram is shown in simplified form with the assumption that the lines of conducting deposit will carry the current required to energize magnets 21. In practice, however, only a small current is passed across the file card surfaces and electronic pickup and amplifying relays would be interposed between the cards and magnets 21 in known manner.

*Modification*

In Figs. 13, 14 and 15 is shown a modified form of the invention in which the storage devices are arranged vertically in a drawer and in which data values can be set up through the medium of a perforated card.

Referring to Fig. 14, each storage device comprises an insulating panel 200 held in spaced position in slotted cross bars 201 and 202 which constitute the file drawer. The lower bar 202 is channeled to slide on a guide rail 57a corresponding to rail 57 in the main form.

Fixedly spaced on panel 200 are metallic connector strips 203 extending horizontally across the drawer (see Fig. 15) with one for each of the twelve data positions. Each strip 203 has a series of tongues 204 pressed out therefrom and extending through suitable openings in the panel. The strips and tongues are preferably of light spring metal, so that the tongues have a spring action biasing them outwardly.

Adjacent to panel 200 is a sheet 205 of insulating material upon which are applied strips 206 of metal by well known methods of bonding, electroplating, metal spraying or printing, and both the sheet 205 and its strips are wrapped around a rigid U-shaped member 207. The strips 206 extend vertically and transverse to the strips 203 with spacing the same as for the strips or lines 41 of the main form. Between the two sets of strips is placed a record card 208 in which a perforation 209 is made, through which a tongue 204 contacts a columnar strip 206 and a companion perforation 210 is made through which a tongue 204 on the same strip 203 contacts a value strip 206, so that any columnar strip 206 (corresponding to strips 41 of the main form) is thus electrically connectable to any value strip 206 (corresponding to strips 42 of the main form) through a connecting strip 203.

In Fig. 14, alternate storage devices have their wrapped ends folded over alternate panels 200 along bars 201 and 202, so there is a line of projected round ends along the top and bottom of the file.

When the drawer is inserted in the framework of the machine, the upper round ends will be traversed by upper feelers 63a and the lower round ends by lower feelers 63a carried by positionable frame 66a. The upper and lower contacting feelers 63a are offset by the distance between two adjacent storage devices, as indicated in Fig. 14, so that when the frame 66 is positioned in a selected location the upper feelers if rocked by a related magnet 105a will contact the strips 206 of the second, fourth, etc. storage devices, and the lower feelers, if rocked, will contact the first, third, etc. devices to complete circuit connections in the same manner as explained for the main form of the invention.

In the main form, the data is set up by marking lines (Fig. 11) on cards to contact preprinted or predeposited lines 41, 42 and 43 and to change a setup involves discarding the card 40 and replacing with another differently marked one.

In the modified form, a change is made by replacing a relatively cheaper card 208 with another containing different data perforations. The spacing of the holes is selected with a view to enabling their perforating in standard commercial card punching machines, so that no special equipment is required to prepare them.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a perforating machine, having a plurality of punches, selector magnets for said punches and a series of columnar contacts, the combination therewith of a series of selector circuits, a file of cards each bearing conductive lines arranged thereon to represent value data, and means for selectively connecting the conductive lines of one of said cards in said series of selector circuits intermediate the magnets and the contacts to connect a plurality of the magnets to predetermined columnar contacts.

2. In a perforating machine, having a plurality of punches, selector magnets for said punches and a series of columnar contacts, the combination therewith of a series of selector circuits, a file of cards, each having a plurality of sections bearing conductive lines arranged thereon to represent value data, and means for selectively connecting the conductive lines of a selected section of one of said cards in said series of selector circuits intermediate the magnets and the contacts to connect a plurality of the magnets to predetermined columnar contacts.

3. In a perforating machine, having a plurality of punches, selector magnets for said punches, a series of columnar contacts, the combination therewith of a series of selector circuits, a plurality of files of cards, each card bearing conductive lines arranged thereon to represent value data, means for effecting selection of one of the files, further means for effecting selection of a card in one of the files, and means jointly controlled by both selecting means for connecting the conductive lines of said selected card in said series of selector circuits intermediate the magnets and the contacts to connect the magnets to predetermined columnar contacts.

4. In a perforating machine, a plurality of punch selecting magnets, a file of cards arranged with one edge of each lying in a common plane, with each card containing conductive lines thereon extending to said one edge, a set of feelers electrically connected to said magnets, means for differentially positioning said feelers adjacent the edge of a selected one of said cards, and means for causing the feelers to contact the conductive lines of said selected card to thereby effect an electrical connection between said lines and said magnets.

5. In a perforating machine, the combination with a file of cards, each of which has a series of parallel electrically conductive readout lines and a data line electrically connectable to any one of the readout lines, of a series of punch selecting magnets, one for each readout line connected to one side of a current source, a series of feelers one for each conductive line, means for positioning the feelers in contact with the related lines of a selected card in said file and in electrical connection with corresponding magnets to establish an electrical connection through the lines on the card between the feeler on the data line to the feeler on the connected readout line and to the related magnet.

6. The invention set forth in claim 5 in which a drawer is provided with spacing and retaining means for the cards to hold them in overlapped relationship with the edge of each card projecting from under the edge of the adjacent card in which the feelers are movable across the edges to selectively contact a card along its projected edge.

7. In a perforating machine, the combination with a file of cards, each of which has an arrangement of conductive lines thereon representative of value data and including input and output lines extending to a common edge of the card, the common edges of all cards lying in a single plane, of a set of contacting feelers, means for differentially locating said set of feelers along said plane to contact the lines at the edge of a selected one of said cards, a set of punch selecting magnets, one for each of said output lines connected thereto through certain of said feelers, and means for connecting a selected one of the input lines through another feeler with a source of current whereby a circuit connection is completed from said current source to said magnets in accordance with the value data represented on the card.

8. In a machine of the class described, a supporting framework, a tray of file cards slidably insertible in said framework, the cards in said tray being each provided with designations thereon representing value data, feeler devices supported on the framework, punch selecting devices connectable to the feeler devices, means for effecting relative movement between the tray and feelers to position the feelers in feeling relation with respect to a selected one of the cards, and means controlled by the feelers for controlling the punch selecting devices in accordance with the value data on the selected card.

9. In an apparatus of the class described, a plurality of files of overlapped cards, each card bearing value representing designations arranged for electrical sensing thereof, a sensing device for each file, means for concurrently positioning the sensing devices to a position adjacent a selected and similarly located card in each file, means for rendering a selected one of the sensing devices effective to sense the related card and current responsive devices controlled by said card through the sensing device in accordance with the value data thereon.

10. In an apparatus of the class described, a file of overlapped cards, each bearing value representing designations arranged for electrical sensing thereof, a sensing device, means for positioning the device adjacent a selected card in the file, means for thereafter causing the sensing device to contact the selected card and current responsive devices controlled by the card through said sensing devices in accordance with the value data thereon.

11. In an apparatus of the class described, a file of overlapped cards, each bearing value representing designations thereon, a sensing device, means for positioning the device adjacent a selected card in the file, means for thereafter effecting sensing engagement between the device and the selected card and recording devices controlled by the card, through said sensing devices in accordance with the value data thereon.

12. In an apparatus of the class described, a file of spaced cards mounted in a stationary position, and each bearing value representing designations, a sensing device, means for moving said device parallel to the direction of said file and out of contact with the cards to a position adjacent a selected one of them, means for thereafter effecting sensing engagement between the device and the selected card, and recording devices controlled by the card through said sensing devices in accordance with the value data on the selected card.

13. In an apparatus of the class described, a plurality of files of spaced cards each card bearing value representing designations, a sensing device for each file normally out of engagement therewith, means settable to represent a selected file, further means settable to represent a selected card in each file, means for moving the sensing devices concurrently across their related files of cards, means controlled by said further settable means to interrupt said movement to position the sensing devices each adjacent the selected card in each file, means controlled by the first settable means for effecting sensing engagement between the sensing device of the selected file and the selected card, and recording devices controlled by said card through said sensing device in accordance with the value data thereon.

14. In an apparatus of the class described, a series of file cards bearing value representing designations, means settable to represent a selected card, a movable sensing device, means controlled by said settable means for effecting movement of said sensing device into engagement with the selected card, and recording devices controlled by the card through said sensing device in accordance with the value data thereon.

15. A data storage device comprising a card of non-conductive material, a series of parallel conductive value lines at one end of the face of the card, a series of parallel classification lines at the other end of the face of the card, a series of parallel lines extending across the back of the card in a direction transverse to the lines on the face, including a line for each value line, and each being electrically connected through the card to the corresponding line on the face, and conductive lines connecting each classification line through the card to any selected value line on the back, whereby each classification line on the face of the card is selectively electrically connected to any value line on the same face.

16. The invention in claim 15 in which the electrical connection between related value lines on the face and back of the card comprises conductive material coated on the inner surface of a perforation through the card at the point of intersection of the related value lines.

17. The invention in claim 15 in which the conductive line connecting a classification line on the face with a value line on the back comprises conductive material coated on the inner surface of a perforation through the card and line at a point adjacent the value line and a line extending from the perforation to the said adjacent value line.

18. A data storage device, a plurality of stacked units, each unit comprising a sheet of insulating material, a plurality of parallel conducting strips affixed thereto and arranged in sets, one set representing values and the other representing columnar positions, a plurality of conducting strips extending transversely to the first named strips, a record card interposed between the conducting strips and the connecting strips, said card having a first perforation at the point of intersection of a columnar strip and a connecting strip, and a second perforation at the point of intersection of said connecting strip and a value strip, said connecting strip contacting the columnar and value strips through the perforations to effect an electrical connection therebetween, and current responsive devices controlled through said connection in accordance with the value represented by said perforations.

19. A data storage device for controlling a punching machine, comprising a plurality of stacked assemblies, each comprising a pair of superposed sheets of insulated material, one of which has a set of parallel conductive value lines and a set of parallel conductive columnar lines on one face thereof and the other has a set of parallel connecting lines extending transversely to the lines on the first sheet, said lines being on the sides of the sheets facing one another, a perforated record card intermediate the sheets with a perforation at the intersections of a connecting line with both a columnar and a value line whereby, when the sheets are pressed together, an electrical connection is completed from a columnar line through a connecting line to a value line, and a punch controlling device included in said electrical connection.

20. A data storage device comprising a sheet of non-conductive material, a series of parallel conductive value lines on one face of the sheet, a series of parallel conductive lines extending across the back of the sheet in a direction transverse to the lines on the face, including a line for each value line, said sheet having open perforations at points of intersection of lines on the face and lines on the back, through which perforations electrical connection between intersecting lines is made which comprises conductive material coated on the inner surface of the perforations whereby value lines on the face of the sheet are electrically connected to lines on the back.

21. A data storage device comprising a sheet of non-conducting material, a series of conductive value lines on one face of the sheet, a series of conductive lines extending across the back of the sheet in a direction non-parallel to the lines on the face, including a line for each value line, said sheet having open perforations at points of intersection of lines on the face and lines on the back, through which perforations electrical connection between intersecting lines is made which comprises conductive material coated on the inner surface of the perforations, whereby value lines on the face of the sheet are electrically connected to lines on the back.

22. A data storage device comprising a sheet of non-conducting material having a plurality of value representing, perforation receiving positions, said positions being provided with open perforations made in accordance with a value to be represented, conductive material coated on the inner surfaces of said perforations and conductive lines on both sides of the sheet, each intersecting one or more perforations whereby a continuous electrical connection is formed which extends along a line on one face, through the conductive material within the perforation, and continues to and along a line on the opposite face of the sheet.

23. The invention set forth in claim 20 in which a current source is provided and contacting devices to direct current to each of one set of said lines in succession whereby the related lines of the second set will receive current in the order determined by the perforation arrangement.

24. In a machine of the class described, a supporting framework, a tray of file cards slidably insertible in said framework, the cards in said tray being each provided with designations thereon representing value data, feeler devices supported on the framework, recording devices connectable to the feeler devices, means for effecting relative movement between the tray and feelers to position the feelers in feeling relation with respect to a selected one of the cards, and means controlled by the feelers for controlling the recording devices in accordance with the value data on the selected card.

REYNOLD B. JOHNSON.

REFERENCES CITED

The following references are of record in the file of this patent:

UNITED STATES PATENTS

| Number | Name | Date |
|---|---|---|
| 1,772,186 | Lee and Phillips | Aug. 5, 1930 |
| 1,914,293 | Reynolds | June 13, 1933 |
| 1,976,618 | Lee and Daly | Oct. 9, 1934 |
| 2,045,977 | Bryce | June 30, 1936 |